Figure 1:
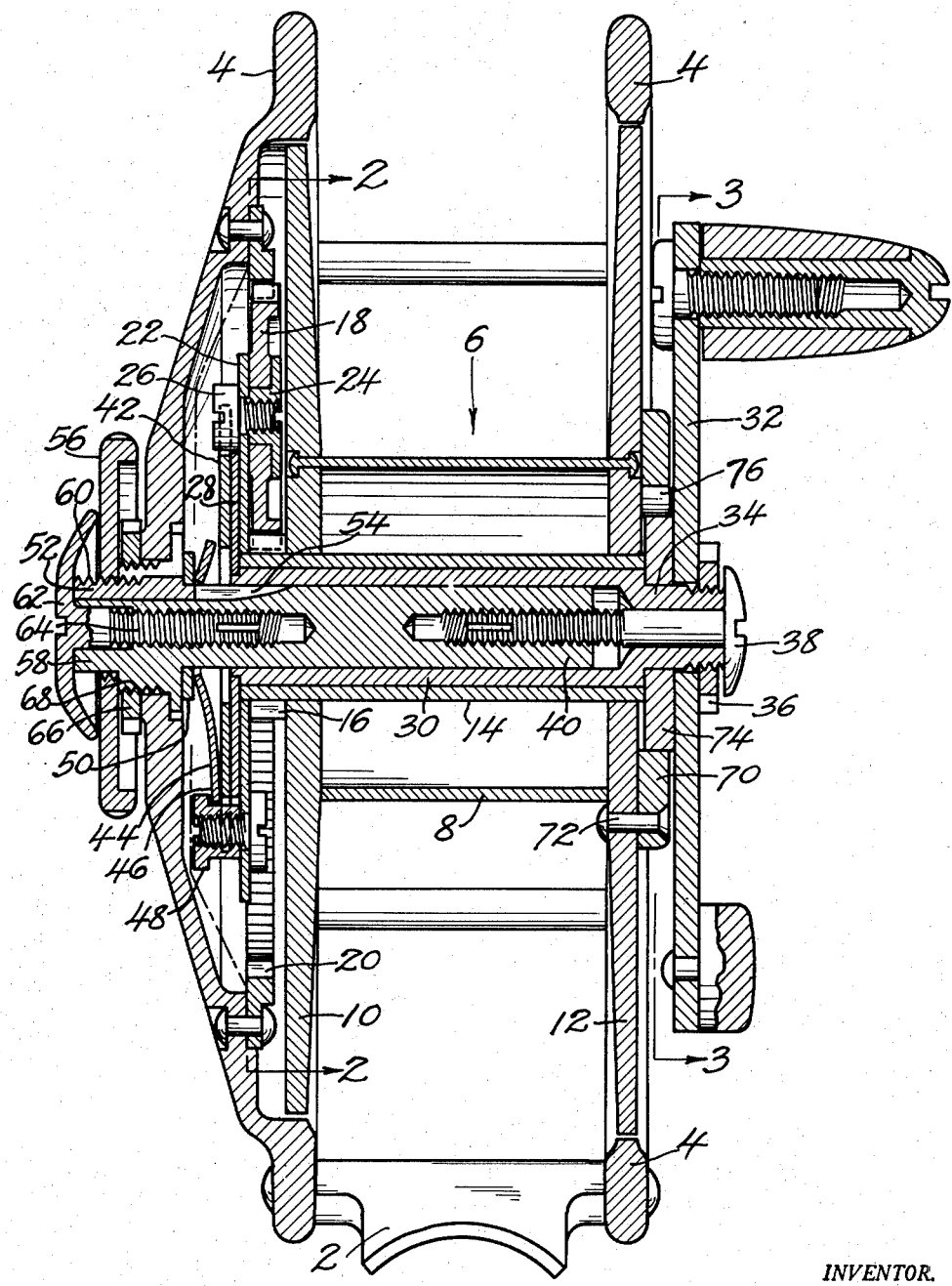

Aug. 8, 1950   L. B. FEIERABEND   2,517,776
AUTOMATIC TWO-SPEED FISHING REEL

Filed Sept. 17, 1945   2 Sheets-Sheet 2

INVENTOR.
LOUIS B. FEIERABEND
BY
Albert Sperry
ATTORNEY

Patented Aug. 8, 1950

2,517,776

UNITED STATES PATENT OFFICE 2,517,776

AUTOMATIC TWO-SPEED FISHING REEL

Louis B. Feierabend, New Hope, Pa.

Application September 17, 1945, Serial No. 616,861

2 Claims. (Cl. 242—84.5)

My invention relates to fishing reels and particularly to reels for use in fly fishing.

It is usual for the angler when casting with a fly or similar light weight lure to draw line from the reel so that it will pay out freely during the cast and without the drag of the reel. It is also usual to have the line loose in the hand in order to manipulate the lure. Thereafter, in the event of a strike the angler must retrieve the slack line quickly and keep the line taut in order to play the fish properly. However, in order to take up the loose line the slack has to be reeled in by turning the handle of the reel and accordingly he must drop the line in his hand in order to operate the reel. At such times there is always a critical period during which the loose line may foul or catch on brush or stones and the fish may shake the hook loose and escape.

In order to shorten this period and permit the line to be reeled in quickly the spools of fly reels are sometimes provided with spring means or with gearing between the handle and spool of the reels to speed up recovery of the slack line. However, spring mechanism frequently gets out of order, whereas the gearing heretofore provided does not allow for the slow and direct reeling in of the line which is necessary in order that the fish may be played properly and to advantage.

In accordance with my invention fly fishing reels are provided which overcome the disadvantages of constructions of the prior art by providing speed multiplying gearing between the handle and spool without sacrificing the advantages of a direct connection between the handle and spool necessary for playing the fish. The construction herein described also serves to impose an automatic and predetermined braking action or drag upon the line in the event the fish darts away from the angler and thus causes the line to rotate the spool and gearing in a reverse direction.

One of the objects of my invention is to provide a reel for fly fishing wherein alternative speed ratios of the handle and spool are available.

Another object of my invention is to provide a fly fishing reel with means for automatically changing the speed ratios of the handle and spool.

A further object of my invention is to provide a fly reel with novel gearing and action for use in taking up slack line and for playing the fish.

Another object of my invention is to provide means for automatically imposing a predetermined drag on the line as it is drawn from the reel.

These and other objects and features of fishing reels embodying my invention will appear from the following description thereof in which reference is made to the figures of the accompanying drawings.

Figure 2:
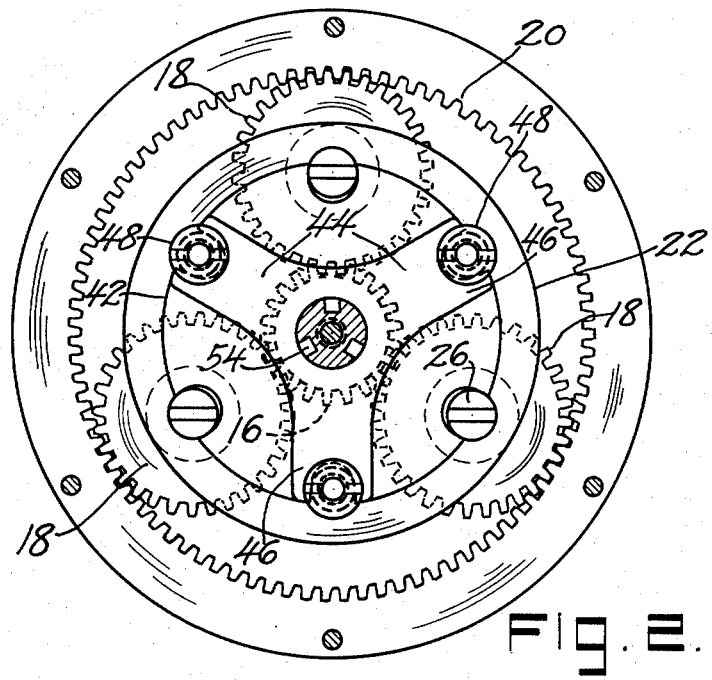
Figure 3:
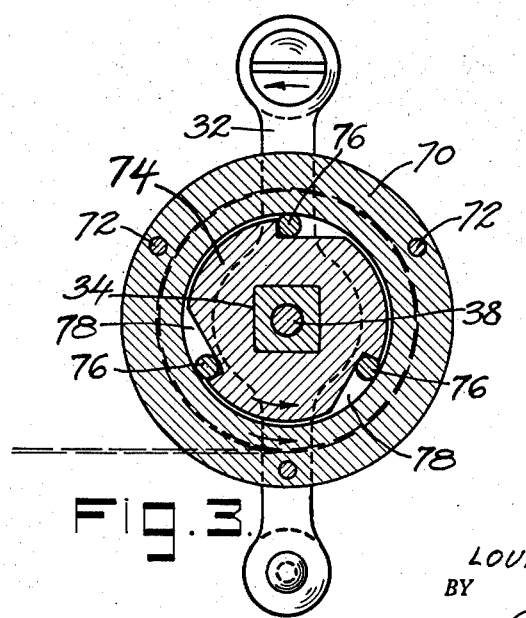

In the drawings:

Fig. 1 is a vertical sectional view through a typical reel embodying my invention, Fig. 2 is a vertical sectional view of the construction shown in Fig. 1 taken on the line 2—2, and Fig. 3 is a vertical sectional view of a portion of the construction shown in Fig. 1 taken on the line 3—3.

In that form of my invention chosen for purposes of illustration in the drawings, the reel is provided with a base 2 for mounting the reel on a fishing rod and has a frame 4 secured to the base 2 for housing the spool 6 of the reel. The spool embodies an arbor 8 of suitable diameter upon which the line is wound and has side plates 10 and 12 which are secured to the arbor 8 and to the central tubular bearing member 14 of the spool. The left hand end of the bearing member 14 of the spool, as seen in Fig. 1, is provided with a sun gear 16 which meshes with planetary gears 18 that cooperate with the inwardly facing stationary ring gear 20 mounted on the frame 4 of the reel. The planetary gears 18 are mounted on a disc 22 by means of retainers 24 and the screws 26 and are rotatable with the disc about the tubular bearing member 14 of the spool.

The disc 22 is driven by means of a driving plate 28 secured to the tubular driving shaft 30 to which the handle 32 of the reel is attached. The handle is secured to the driving shaft 30 by engagement with the squared end 34 of the shaft and is held against longitudinal displacement relative to the driving shaft by a retaining member 36 and the screw 38 which extends through the squared end of the shaft 30 and is threaded into the main journal 40 of the reel.

The driving plate 28 on the driving shaft 30 is located between the disc 22 and a pressure plate 42 which surrounds the main journal of the reel. The pressure plate 42 is urged toward the driving plate 28 by means of an adjustable loading spring 44 the extremities 46 of which bear against the pressure plate 42 and are held in place with respect to the pressure plate and disc 22 by means of the retaining bolts 48. The central portion of the loading spring 44 bears against a follower 50 which is adjustable toward and away from the pressure plate by means of a plurality of plunger keys 52 slidable in slots 54, three of which are shown in Fig. 2 in circumferentially spaced relation about the main journal 40 of the reel. The plungers are movable toward and away from the pressure plate 42 by means of a drag adjusting nut 56 which surrounds the reduced end 58 of the main journal 40 and is threaded onto complementary threaded portions 60 of the plunger keys 52. An outer stop member 62 limits outward movement of the plunger keys 52 and is secured to the main journal 40 of the reel by the threaded stem 64. The main journal itself is secured to the frame of the reel by the attaching nut 66 engaging the threads 68 on the end of the journal.

The arrangement thus provided presents a friction clutch in the driving connection between the handle and the planetary gears and this connection is adjustable to allow slippage to occur. With this construction the spool of the reel may be driven by the handle through the planetary gears at a speed ratio, of say 5 to 1, so as to permit the slack line to be taken up rapidly but after the slack line has been taken up the spool will not rotate freely and the friction clutch means will permit slippage between the driving shaft and the plate which carries the planetary gears.

When the line is taut, as when playing the fish, such slippage takes place and it is then desirable to provide a direct connection between the handle and the spool so that the line may be taken in more slowly. For this purpose an over-running clutch is provided between the spool and the handle. As shown in Figs. 1 and 3 the side plate 12 of the spool is provided with a driving ring 70 secured to the outer face thereof by rivets 72 or otherwise whereas a driving cam 74 is secured to the squared end 34 of the driving shaft 30 to which the handle 32 is secured. Rollers 76 are located in the inclined cam recesses 78 between the driving cam and the driving ring so that when the rollers move toward the reduced end of the cam recesses the spool will be locked to the driving shaft 30 for direct rotation by the handle, but when the rollers move into the enlarged portions of the cam recesses the spool will be free to be driven more rapidly by the planetary gear system.

In the operation of the construction shown and described rotation of the handle 32 in the direction of the arrow in Fig. 3 to take up slack line, moves the driving cam 74 in a counter-clockwise direction and will tend to cause the rollers to move toward the smaller end of the recesses 78 to lock the handle to the spool. However, if the spool is not retarded the planetary gears will operate, driving the spool more rapidly than the handle and in a counter-clockwise direction so that the rollers 76 will be carried toward the enlarged portions of the cam recesses. The spool will then operate to take up the slack line very quickly but as soon as the slack is retrieved and a load is applied to the line the spool will be retarded. When the load is sufficient the friction clutch will slip and the driving cam 74 will rotate more rapidly than the driving ring 70 so that rollers 76 will move toward the reduced ends of the cam slots and lock the driving ring to the driving cam and handle 32. In this way there is an automatic shifting to a direct driving connection between the spool and handle. On the other hand as soon as the load on the line is released or reduced the friction clutch will operate to restore the high speed driving connection between the handle and the spool.

This construction further serves to apply an automatic braking action or drag on the line in the event the spool is rotated in the reverse direction by a pull on the line as the fish swims away from the angler. Under such circumstances the spool is not only connected to the handle by rollers 76 for direct drive of the handle, but is also connected to the handle through the planetary gearing and the friction clutch for driving the handle from the sun gear at the ratio of 1 to 5. These two different driving connections render it necessary for the friction clutch to slip in order for the spool to rotate and as a result the clutch exerts an automatic braking action on the line.

The loading of the clutch may be varied as desired and by using a relatively large drag adjusting nut as shown the angler may alter the drag readily and even during use of the reel to render the automatic shifting means as sensitive as desired to loading of the line and to vary the braking effect applied when the line is drawn from the reel and the spool rotated in the opposite direction.

When using a reel of the type described the cast and manipulation of the lure are carried out in the usual manner by drawing line from the spool and holding it loose in the hand. In drawing out the line the drag adjusting nut may be backed off if desired so as to draw line more readily from the spool. Thereafter the drag adjusting nut may be returned to a normal or preferred setting for playing a fish. In the event of a strike the loose line is released and the slack can be taken up rapidly by rotating the handle 32 which acts through the friction clutch and planetary gear system to drive the spool more rapidly than the handle. When the slack is taken up and the line becomes taut the line will impose a drag on the spool and when the spool is retarded sufficiently to overcome the action of the friction clutch the clutch will slip and the driving cam of the over-running clutch associated with the handle will move to force the rollers 76 into locking engagement with the driving ring 70 on the plate 12 of the spool. The spool then will be driven directly with the handle so that it can be suitably operated for the most effective play of the fish. Thereafter if the fish should swim away from the angler so as to draw line from the reel and rotate the spool in the reverse direction the different driving speeds of the connections between the spool and handle will require slippage of the friction clutch so that a braking action is imposed on the line to an extent determined by the adjustment of the drag adjusting nut 56.

This transition from high speed to direct drive of the reel takes place automatically and even in the event the fish swims rapidly toward the angler so that the load on the spool is relieved. The high speed driving connection will then become immediately and automatically operative to take up the slack line quickly so that the angler need not divert his attention or alter his technique or manner of playing the fish since all of the operations of casting, manipulation and play are carried out in the usual manner of playing the fish while the recovery of slack line, which is one of the greatest hazards in fly fishing, is speeded up materially. Similarly the braking action imposed on the line when the fish swims away is applied automatically and may be adjusted readily or even during play of the fish if desired.

While I have illustrated and described a preferred form of fly reel embodying my invention it will be understood that numerous changes and modifications may be made in the form, construction and arrangement of the various elements without departing from the spirit and scope of my invention. In view thereof it should be understood that the embodiment of my invention herein shown and described is intended to be illustrative only and is not intended to limit the scope of my invention.

I claim:

1. In a fishing reel having a handle and a spool, planetary gearing between the handle and spool, a friction clutch between said planetary gearing and handle, means yieldably urging elements of said friction clutch into driving engagement, means for adjusting said yieldable means, and an over-running clutch operable to establish a driving connection between the handle and spool on slippage of said friction clutch.

2. A fishing reel having a frame, a main journal mounted on said frame, a tubular driving shaft rotatable about said main journal, a handle secured to said driving shaft, a spool having a tubular bearing portion rotatable about said tubular driving shaft, planetary gearing between said driving shaft and tubular bearing for driving said spool at a higher speed than said handle on rotation of said handle, a friction clutch associated with said planetary gearing and operable to render said gearing inoperative in response to drag on the spool, and an overrunning clutch between said handle and spool for establishing a direct drive between the handle and spool on slippage of said friction clutch.

LOUIS B. FEIERABEND.

REFERENCES CITED

The following references are of record in the file of this patent:

UNITED STATES PATENTS

| Number | Name | Date |
|---|---|---|
| 377,100 | Gates | Jan. 31, 1888 |
| 838,915 | Sykes | Dec. 18, 1906 |
| 1,999,202 | Osgood | Apr. 30, 1935 |
| 2,240,075 | Kovalovsky et al. | Apr. 29, 1941 |
| 2,332,481 | Boor | Oct. 19, 1943 |
| 2,417,732 | Bland et al. | Mar. 18, 1947 |

FOREIGN PATENTS

| Number | Country | Date |
|---|---|---|
| 250,718 | Great Britain | Apr. 22, 1926 |